Oct. 11, 1960     E. H. SMYTHE     2,956,274
OBJECT LOCATION SYSTEM
Filed Aug. 20, 1945     5 Sheets-Sheet 2

INVENTOR
E. H. SMYTHE
BY
ATTORNEY

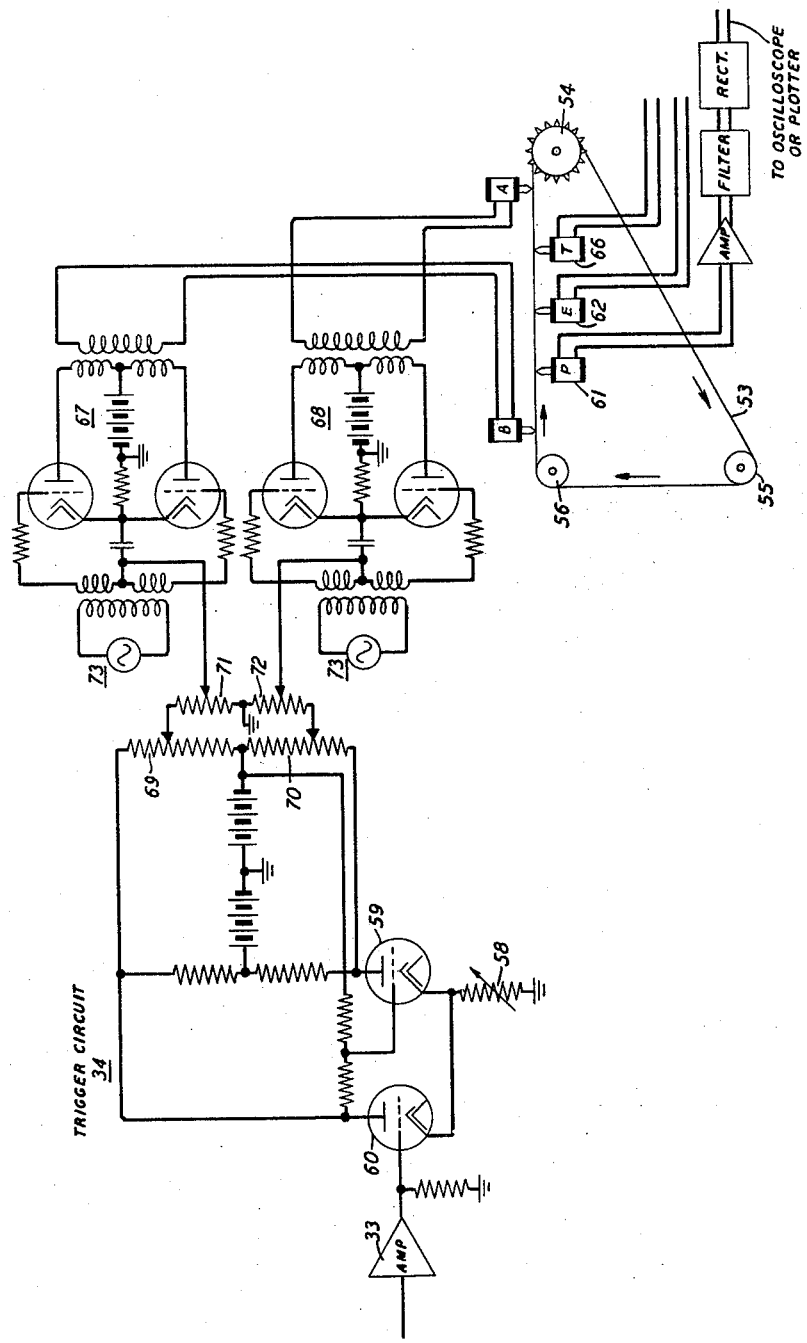

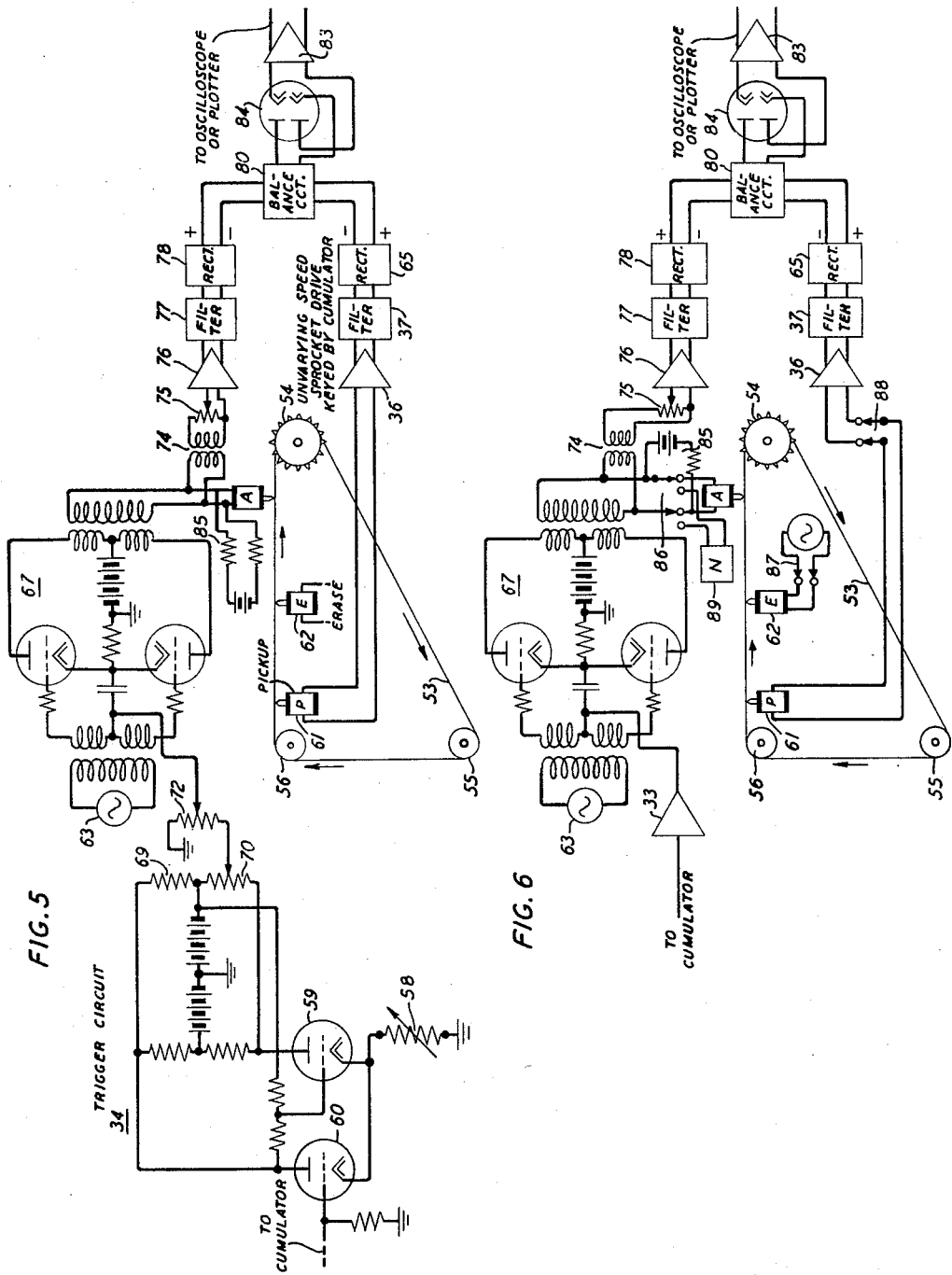

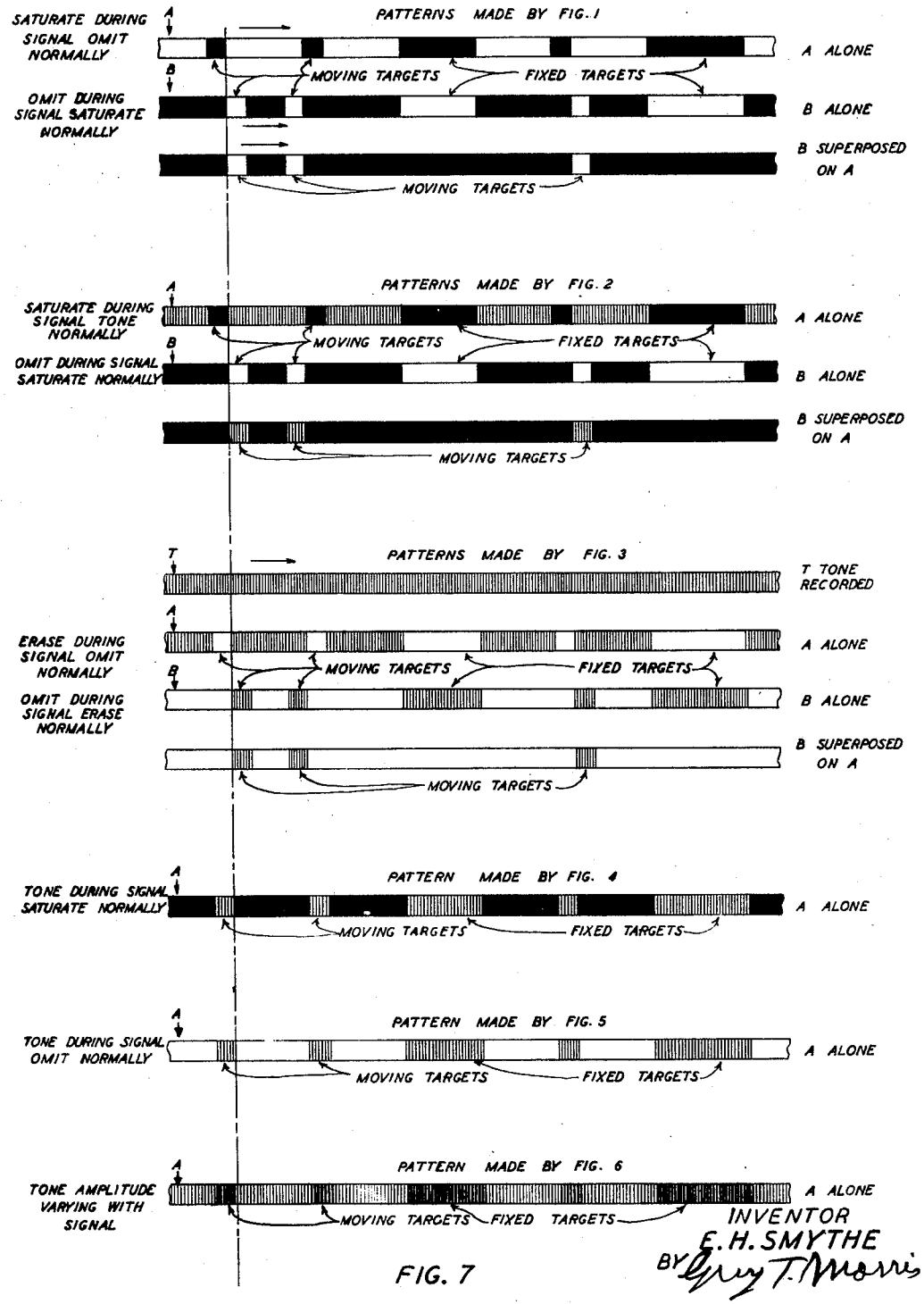

United States Patent Office 2,956,274
Patented Oct. 11, 1960

2,956,274

OBJECT LOCATION SYSTEM

Edwin H. Smythe, Evanston, Ill., assignor to Bell Telephone Laboratories, Incorporated, New York, N.Y., a corporation of New York Filed Aug. 20, 1945, Ser. No. 611,648

26 Claims. (Cl. 343—7.7)

This invention relates to an object location system of the radar type. It relates more particularly to the provision in such a system of a method and means for discriminating between fixed and moving target indications in such a way that the signal indications from fixed objects or targets are substantially eliminated and only the signal indications from moving objects or targets remain. This result is technically known as the elimination of ground clutter.

In a radar system, an exploratory area is ordinarily scanned by projecting into the area a rapidly recurrent succession of energy pulses. Each of these pulses excites energy reflections from all objects in the area upon which the projected pulse impinges, and these reflections or echoes register at the radar station in lengths of time after the projected pulse which vary with the distance of the object from the pulse transmitting antenna. As registered upon the receiving oscilloscope in an early warning radar system the positions of the reflecting objects or targets appear as positional or brilliancy modulations located along the sweep line of the oscilloscope in proportion to the distances of the objects from the scanning antenna. Many of such reflected signals are of no interest to the operator, being from stationary objects such as buildings, hillsides and other ground surface irregularities, stationary objects along a shore line or rising from the surface of the water. Signals reflected from such objects tend to obscure the moving target signals in which the operator is primarily interested. It is the object of the present invention to cancel out to as great an extent as possible signals reflected from such stationary objects so that approximately the only signal indications appearing on the field of the plan position indicator or the automatic plotter are those representing moving targets.

In accordance with the present invention, this result is accomplished by balancing out or canceling signals from objects the positions of which have not changed in the interval between two or more successive scans of a particular area. This is most conveniently done, as will appear from the detailed description that follows, by making a receord of all the reflected signals received from a particular scanned area upon a record medium continuously moving at an unvarying velocity, preferably a magnetic tape, and employing this record to effect the canceling out of all signals received in a subsequent scan of the same area from objects whose positions have not changed in the interval between the two scans. The cancellation is effected either by causing the second series of signals to be superposed in a particular way upon the same unit length of the recording medium upon which the first series of signals was recorded, or by reproducing the first recorded series in synchronism and phase with the signals received as a result of the second scan, balancing out electrically the signals of the two series that are exactly coincident in point of time, and utilizing the unbalanced signals to produce indications on the oscilloscope or plan position plotter corresponding with the objects or targets that have moved in the interval between scans.

The elimination of the fixed object signals and the retention of the moving target signals is most conveniently practiced in a radar system of the type in which the reflected energy of a multiplicity of pulse-echo scans of targets in a particular area is accumulated and stored, and is then transmitted by the cumulator mechanism to the recording and canceling mechanism at a rate that is slow as compared with the pulse-echo scanning rate. This has the effect of reducing the width of the signal frequency band and facilitating the recording and canceling operations. After the signals corresponding to fixed objects are canceled or balanced out, the remaining signals representing moving targets are transmitted to the oscilloscope of a plan position indicator or to the mechanism of an extended scale plan position plotter where they are translated into visible target indications.

The invention will be more clearly understood by reference to the following description, taken in connection with the accompanying drawings forming a part thereof, in which:

Figs. 2, 3, 4, 5 and 6 are schematic circuit diagrams representing various circuit organizations whereby the objects of the present invention may be realized; and Fig. 7 represents the magnetic patterns produced on the tape by means of the various circuit organizations of Figs. 1 to 6, inclusive.

Figure 1:
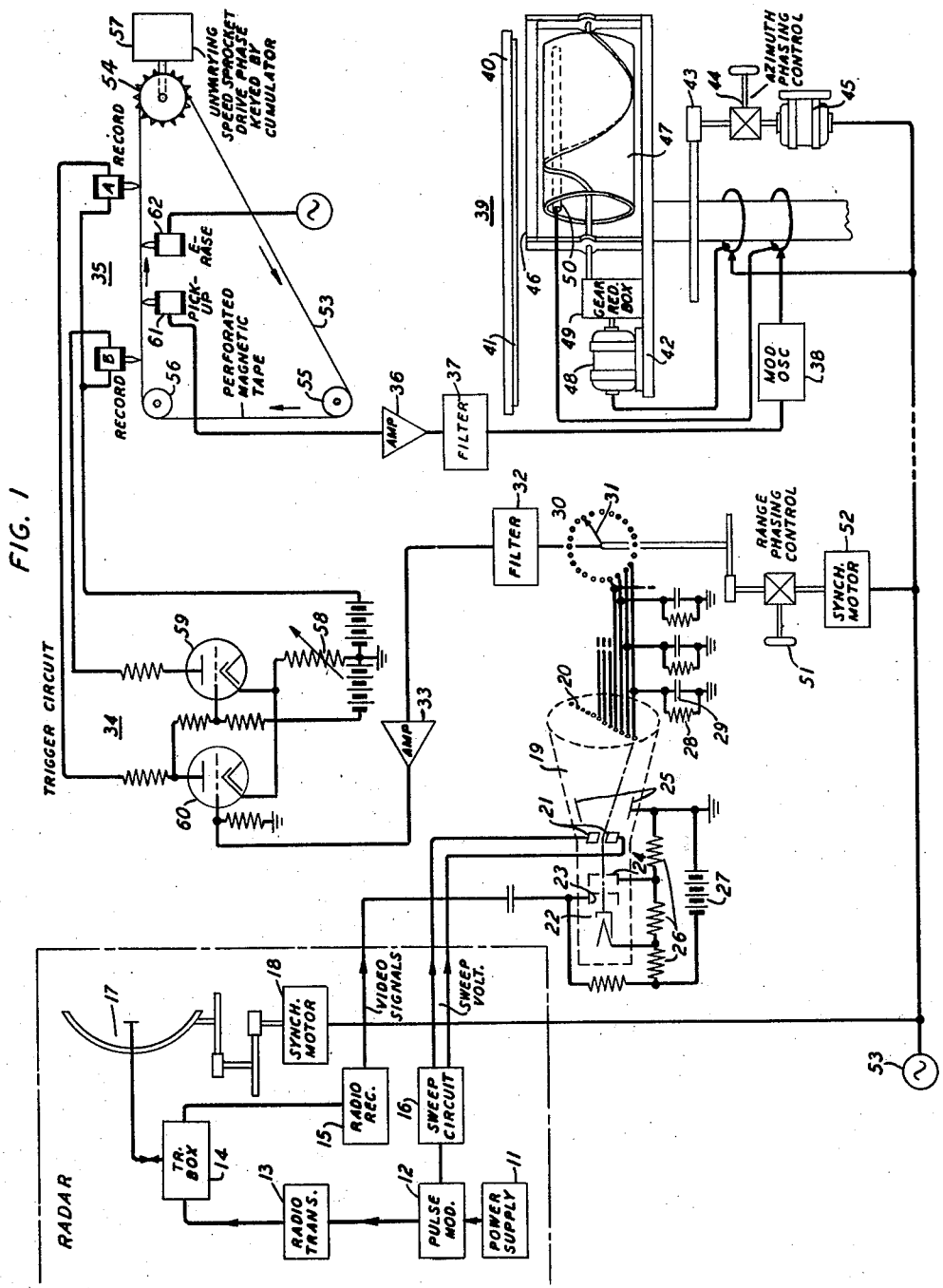
Fig. 1 shows in schematic form an object location system embodying the fixed target eliminating principles of the present invention.

Fig. 1 shows schematically a complete object location system including as one of its elements one of the various forms of organizations for eliminating fixed target signals in accordance with the principles of the present invention, and Figs. 2 to 6, inclusive are limited to modified forms of such organizations which may be included in object location systems like that of Fig. 1, or other object location systems of the same general nature.

Referring first to the complete system represented in Fig. 1, this system is generally similar to that of an application of W. C. Tinus, Serial No. 585,668, filed March 30, 1945, now Patent 2,617,094, issued November 4, 1952. Portions of this system which represent elements that are well known and commonly employed in the art are represented in block schematic form. In the arrangement of Fig. 1, power is transmitted by the source of power supply 11 to the pulse modulator 12, which is connected by way of the radio transmitter 13 and the TR box 14 to the antenna 17. The pulse modulator 12 produces pulses at any suitable periodicity, for example, 400 per second, each pulse having a length of from one or a fraction to ten microseconds. These pulses are modulated by a suitable ultra-high frequency carrier and are transmitted by way of the radio transmitter 13, TR box 14, and antenna 17.

The pulse modulator 12 can comprise an oscillator for providing a sine wave having a suitable periodicity. This oscillator energizes a pulse generator of any one of several suitable types well known to the art; for example, that disclosed in U.S. Patent 2,117,752, issued May 7, 1938, to L. R. Wrathall, which provides an energy pulse at a particular point of each cycle of the input wave supplied to it. The pulses from the pulse generator, modulated by the ultra-high frequency carrier, are applied by way of the TR box 14 to the antenna 17, which serves both as a transmitting antenna and as a receiving antenna to receive waves reflected from one or more objects within the range of the transmitted pulses. The antenna 17 may be of any suitable type, for example, the polystyrene "polyrod" type disclosed in an application of G. E. Mueller, Serial No. 469,284, filed December 17, 1942, now Patent 2,425,336, granted August 12, 1947.

The reflected waves picked up by the antenna 17 pass by way of the TR box 14 to the radio receiver 15, and are applied together with a sweep voltage from the sweep circuit 16 to the cathode ray or electron beam tube 19. In order that there may be discrimination against random disturbances of relatively large magnitude and in favor of the reflected target signals the radio receiver 15 preferably includes a clipper or amplitude-limiting device, such as that disclosed in Patent 2,395,575, issued February 26, 1946, to D. Mitchell, for limiting the intensity of all voltage variations to that of the maximum signal desired. By way of example, the clipper will remove all voltage variations of greater magnitude than that of the strongest echo.

The sweep voltage is a sweep wave of saw-tooth form, produced, for example, by a sweep circuit such as disclosed in Patent 2,178,464, issued October 31, 1939, to M. W. Baldwin, Jr. Pulses from the pulse generator and modulator 12 are communicated to sweep circuit 16 to initiate each of the sweep waves so that the electron beam in the cathode ray tube 19 starts sweep cycles synchronously with the transmission of the pulses. If desired, by the use of well-known variable delay means, the sweep wave can be initiated in a predetermined short interval after the transmission of each of the pulses to the antenna 17.

The cathode ray tube 19 is one of the elements of the cumulator, which together perform the function of receiving, distributing in order and storing the target echoes or received signals at the video frequency rate at which they are received from the scanning antenna, and subsequently reducing them to an audio frequency rate at which they are transmitted to the recording and canceling or balancing mechanism. The cathode ray or electron beam tube 19 may conveniently be of the general type of the tube 20 disclosed in Patent 2,451,484, issued October 19, 1948, to Gould and Mertz. Similarly to the tube 20 of the abovementioned patent, the tube 19 of the present application comprises an evacuated container enclosing an extended series of collecting elements 20, an electron gun for generating, focussing and accelerating a beam of electrons of such velocity as to be capable of building up negative charges on the collecting elements, and a pair of electrostatic deflecting plates 21 for causing the beam of electrons to impinge upon each of the collecting elements 20 in turn. The electron beam generated by the electron gun is modulated by the video target signals or reflected impulses detected and amplified by the radio receiver 15. The electron gun may comprise a cathode 22, a control electrode 23 and accelerating members 24 and 25. The control electrode 23 is normally maintained at any suitable negative potential with respect to the potential of the cathode 22 by appropriate connection with the serially arranged resistance 26 connected across the terminals of the direct current power supply 27. The electron accelerating elements 24 and 25 are so connected with the resistance 26 as to give them appropriate positive potentials with respect to the cathode 22, the cathode being so connected as normally to have a positive potential with respect to the control element 23. The potential applied to the various electrode members and the location and shape of these members are such that the beam of focussed electrons impinges successively upon the elements 20 as it is moved under the influence of the deflection plates of the sweep circuit. These collecting elements 20 may, if desired, be treated with carbon so as to insure that the ratio of primary electrons striking each element to the number of secondary electrons leaving it is greater than one.

Each of the elements 20 swept by the beam of electrons is connected through a parallel resistance member 28 and capacity member 29 to ground and the positive pole of the direct current power supply 27. The resistance 28 allows the charge imparted by the electron beam gradually to leak off, but the time constant of each circuit, uniform with the time constants of the other circuits, is longer than the time between successive pulses projected by the antenna 17. The charge accumulated at each of the elements 20 therefore is gradually built up by the series of received impulses from each target at the repetition rate of the transmitted pulses. Each of the collecting elements 20 of the cathode ray tube with its storing capacitance 29 and shunted resistance 28 is connected with a corresponding contact member on the cumulator switch 30. These contact members are adapted to be successively engaged by a rotating switch arm 31. As each is engaged, the charge accumulated in the associated condenser is transmitted to the assemblage of elements that constitute the recording and canceling or balancing organization by way of a filter 32, an amplifier 33, and a "trigger circuit" 34. After being acted upon by the recording and balancing mechanism 35 in such a way as to eliminate the signals corresponding with fixed objects or targets, as will be described in detail hereinafter, the signals corresponding with moving targets pass by way of amplifier 36, filter 37 and modulator oscillator 38 to the plotter 39.

The plotter in the present instance includes a transparent plotting table 40 provided with a photoluminescent or phosphorescent coating 41 on its under-surface, and a platform 42 continuously rotated in a horizontal plane through the medium of gears 43 and azimuth phasing control 44 by synchronous motor 45. The platform 42 carries a radially extending mask 46 rotating in close proximity to the under-surface 41 of plotting table 40 and provided with a narrow radial linear slot. A cylindrical mask 47 having a narrow helical slot extending in one convolution from approximately one end to approximately the other end of the mask is mounted with the upper surface of its shell in close proximity to the radial slot in the mask 46 and is rotated on a radial axis (that is, radial with respect to platform 42 but longitudinal with respect to cylindrical mask 47) by synchronous motor 48 through the gear reduction box 49. Lying immediately beneath the linear slot in radial mask 46 but with the helically slotted shell of cylindrical mask 47 interposed is an ultra-violet lamp 50 which may conveniently be what is known as a "germicidal" lamp, a lamp generally like the commercial fluorescent lamps except that the tubular shell is made of a type of glass relatively transparent to ultra-violet light and does not have an interior fluorescent coating. Ultra-violet light from the lamp 50 which passes through the intersection of the helical slot in cylindrical mask 47 and the linear slot in the radially extending mask 46 falls upon the photoluminescent under-surface 41 and excites phosphorescence at the particular point upon which the ultra-violet light impinges. The phosphorescent coating 41 is preferably of a material chosen to have a sufficiently long luminous persistence to permit the operator or operators attending the plotting table to mark each significant luminous target indication as it appears. The top of the table 40, in accordance with the usual practice, would normally carry a grid map of the area being scanned by the radar antenna, and the target signals of interest would be marked on this map directly above the corresponding luminous points produced on the phosphorescent surface.

The rotating platform 42 and the associated radial mask 47 are arranged to be driven in synchronism with the azimuthal sweep of the radar antenna 17, and the cylindrical mask 47 is arranged to be driven in synchronism with the range scanning rotation of the brush 31 of the cumulator. The antenna 17 is rotated through speed reduction gear by the synchronous motor 18, and the brush 31 of the cumulator is rotated through speed reduction gearing and mechanical differential gearing 51 by the synchronous motor 52. The synchronous motors 45, 48, 52 and 18 all derive their alternating current power from the same source of supply 53 and therefore are maintained in operating synchronism with each other. The source of supply 53 is accurately controlled to operate at a constant unvarying speed. By means of the mechanical differential 44 the azimuthal phase relation of the radially slotted mask 46 with the map of the exploratory area on the plotting table 40 is manually adjusted to correspondence with the azimuthal phase relation of the antenna 17 with the exploratory area itself, and by means of the mechanical differential 51 the point in the range scanning sweep of the cumulator that is being engaged at the moment by the cumulator brush 31 is manually adjusted to correspondence with the corresponding point of intersection of the helical slot in cylindrical mask 47 with the radial slot in mask 46. Thus adjusted, the luminous target indications on the map of the plotting board each appear at the point in azimuth and range on the map that corresponds with the actual location in azimuth and range of the object or target in the exploratory area being scanned.

As an example it will be assumed that the invention is applied to an early warning radar system in which each cycle of 360 degrees' scan in azimuth is completed in 30 seconds and the pulses projected into the scanned area are at the rate of 400 per second. During each of these $\frac{1}{400}$-second intervals a complete series of energy reflections or echoes is received from all objects, fixed or moving, in the path of the projected pulse. If the cumulator operates at the rate of one cycle in one-half second the reflected energy of 200 pulses will have been received from each target to build up corresponding charges on the cumulator points before these charges are removed in the course of the one-half second cycle of rotation of the cumulator brush. As the complete azimuth scan of the radar antenna is 30 seconds and the cumulator cycle is one-half second, the charges built up in the cumulator in one cycle of its operation will be the charges reflected from $\frac{1}{60}$ of 360 degrees or a six-degree angle of azimuth. Assuming that the radial distance or range effectively scanned is 120 miles and that the cumulator has 120 elements, the reflected energy of each of these elements will be that received from targets in a one-mile length of the 120-mile range scanned. The charges accumulated on these 120 elements will be removed once per operating cycle of the cumulator, and as this cycle is completed in one-half second, the cumulated charges will be removed and transmitted to the recording and canceling devices at the rate of 240 charges per second. This is upon the assumption that each of the 120 cumulator points bears a charge, and indicates the maximum frequency rate at which the cumulator charges are transmitted.

The elements of the system which have to do with the elimination of the signal indications of fixed objects or targets will now be described. Basically, the method is to match with each other two range scans of the same azimuthal area or angle taken with some predetermined time interval separation between them, and erase or balance out those signals the exact coincidence of which indicates that there has been no movement of the corresponding object during the time interval separating the two scans. By making a record of the target signals received in the course of the first scan and subjecting this record in exact synchronism to the action of the signals received during the second scan, or reproducing the signals recorded by the first scan during the receipt of the signals of the second scan and balancing out or canceling all signals that are superposed or exactly coincident in point of time, the only signals remaining are those received from objects the positions of which have changed in the time interval between scans.

This is most conveniently done by making the record magnetically on a length of magnetic tape moving at an unvarying speed, and so timing the rate of movement of the tape that the reproduction from the unit length bearing the signal record of the first scan, or the movement of this unit length of tape past the point where the record of the second scan is superposed, shall exactly coincide with the second scan. The use of magnetic tape as the recording medium is particularly advantageous, on account of the facility with which the record carried by the tape may be magnetically, instantaneously erased to prepare the tape for the receipt of a succeeding cycle of signal records. The tape may thus be in the form of an endless loop the length of which may conveniently be made such as to introduce any desired time interval or delay between the receipt of the first record and the superposition of the second record, or the reproduction of the first record to balance out or cancel the signals of the second corresponding scan.

The mechanism for magnetically moving the tape and recording, reproducing and erasing the signals may be generally similar to that of the magnetic tape recording and reproducing system described in the September 1941 issue of the Bell Laboratories Record, pages 2 to 5, inclusive, with such modifications as will be described to adapt this magnetic recording and reproducing mechanism to meet the particular requirements of the present system. Such an organization is schematically shown in the assemblage of elements identified as 35 in Fig. 1 of the drawing. As schematically illustrated, the magnetic tape 53, which is perforated along one edge to insure positive drive by the sprocket 54, is in the form of an endless loop that passes in a series of convolutions (not shown) over idlers 55 and 56 and a smooth surfaced extension of sprocket 54. The endless loop may be made of any convenient length desired. In the present instance it is assumed that the tape 53 is of such a length that there is 120 feet of tape between recording points A and B in the direction of movement of the tape. The tape is driven by the sprocket 54 at a constant and unvarying velocity, assumed in the present instance to be four feet per second, so that exactly 30 seconds elapses from the instant any point in the tape passes the recording magnet A until that same identical point passes recording magnet B. For the purpose of illustration it may be assumed that each complete range scan is recorded upon a two-foot length of the tape, and consequently that there are 60 range scan units of tape constantly in movement between recording point A and recording point B. Each of these two-foot unit length sections of the tape corresponds with one complete scanning revolution of the cumulator brush 31, the tape driving sprocket 54 being driven at a constant, unvarying over indefinitely long-time intervals, by the driving mechanism 57, electrically or overwise keyed with the revolution of the brush 31. Therefore in the time that the cumulator brush 31 makes one complete revolution serially over the associated contact points, the driving mechanism 57 and sprocket 54 in the assumed case advances the tape exactly two feet. As the movements of the mechanism are at a constant unvarying speed, the same unit length of tape that has passed the recording point A passes the recording point B exactly 30 seconds later.

It may be assumed in the present instance that there are 120 contact points in the cumulator 30, the cumulated charges from which are transmitted to the recording mechanism in the half-second interval required for the brush 31 to make one complete sweep and for a two-foot unit length of tape to be moved past recording point A, and subsequently past recording point B. Each of the charges that has been built up on one of the cumulator contact points is transmitted through the filter 32 and the amplifier 33 to the trigger circuit. The filter may be of the low-pass type capable of passing the frequency band up to and including the twice 120, or 240 per second frequency delivered by the cumulator and excluding higher frequencies. The amplifier 33 is a resistance-coupled amplifier, preferably of the type technically known as a "long tailed pair" and described on pages 113 and 114 of "Industrial Electronic Control" by Cockrell, published by McGraw-Hill Book Company, 1944, and on pages 101 and 102 of the article by Ginzton in the March 1944 issue of "Electronics." This is a circuit organization that has the effect of minimizing the effect of drift in a direct coupled amplifier.

From the amplifier 33 each of the pulses from the cumulator passes to a trigger circuit generally of the type described on pages 57 and 58 of the book "Time Bases" by Puckle, published by Chapman and Hall, Ltd., 1943. This circuit is of a type which triggers in one direction when the input potential rises to a critical value and triggers in the reverse direction when the input potential is reduced to another level. By its use only the cumulator charges having potentials after amplification greater than a critical level predetermined by the setting of variable resistance 58 of the trigger circuit are effective to cause the trigger operation. In this circuit there is normally plate current flow in tube 59 and no plate current flow in tube 60. When the positive potential of the grid of tube 60 rises to the critical value necessary to overcome the normal negative bias determined by the setting of variable resistance 58, plate current starts to flow in tube 60. This drives the grid of tube 59 negative to a point where the tube is blocked and plate current ceases to flow. When the potential of the signal impulse falls below a certain critical level, tube 60 instantly ceases to conduct and the normal condition of conduction in the plate circuit of tube 59 is re-established. It may here be mentioned that the inclusion of amplifier 33 also reverses the polarity of the signal from negative as delivered by the cumulator to the positive polarity necessary to operate the trigger circuit.

The magnet at recording point A is included in the normally non-conducting plate circuit of tube 60 and the magnet at point B is included in the normally conducting plate circuit of tube 59. The voltages of the two sources of direct current supply, the resistances, and the types of tubes employed in the trigger circuit are so chosen that the direct currents supplied to recording magnets A and B are sufficient to cause magnetic saturation of the tape when one or the other is energized by the triggering operation of the trigger circuit. The operating time constants both of the trigger circuit and of the recording magnets A and B are very low, of the order of five or ten microseconds, so that the application of the saturating magnetization to or its withdrawal from the magnetic tape is instantly responsive to the signal.

A schematic representation of the magnetic pattern produced upon the tape in the operation of the system of Fig. 1 is illustrated in Fig. 7. At recording point A the magnet magnetically saturates the tape during the continuance of the signal and omits such saturation normally. This is by virtue of the inclusion of magnet A in the plate circuit of tube 60, which conducts during the signal and is non-conducting normally. At recording point B the magnet by virtue of being connected in the plate circuit of tube 59, is unenergized during the continuation of the signal, and is normally energized to saturate the tape.

Assuming the presence of certain moving and fixed targets in the azimuthal angle being scanning during the one-half second the two-foot unit length of tape is passing recording point A and is again, 30 seconds later, passing recording point B when the same azimuthal angle is being scanned, the patterns due to the operation of magnet A alone, magnet B alone, and the resultant superposition of both patterns are shown in Fig. 7. In A alone of the "Patterns Made by Fig. 1" the short lengths of saturation are arbitrarily assumed to be those produced by moving targets and the longer lengths those made by fixed targets. When exactly 30 seconds later the same unit length of tape starts to move past recording point B, the pattern produced by B operating alone upon clear tape would be that shown in the second of the three strips. That is, the targets would be represented by clear lengths of tape and the absence of target signals would be represented by saturated lengths of tape. But the unit length of tape at recording point B is the same length which has previously been operated upon at recording point A. The third strip of the three shows the effect of the superposition upon the tape of the two series of operations. Two of the moving targets are assumed to have moved closer to the scanning antenna and one to have receded from it. Each of the three is therefore recorded as a clear space on an area of the tape that was left clear by the previous operation at recording point A. Therefore after having passed both recording points, the moving targets are represented by clear or unmagnetized portions of the tape. But in the case of the fixed targets the corresponding clear portion that would otherwise be left by the operation at recording point B exactly coincides with the portion of the tape that had previously been saturated at recording point A. As the fixed target indications were erased by magnetic saturation at recording point A, and as all other points on the tape excepting those occupied by moving target indications are erased by magnetic saturation at recording point B, the fixed target indications are therefore erased and no clear spaces are left on the tape except those corresponding with the moving target indications.

Viewing the operation in another way, it may be said that, inasmuch as saturated tape is erased tape, all targets, fixed and moving as well, are erased by the operation at recording point A, and the erasing operation except with respect to moving targets is completed by the operation at recording point B. If none of the targets had moved during the time interval between the A and B operations, the resultant tape after passing B would be completely erased. But if any of the targets has moved in the interval it is not erased, but is represented by a magnetically clear region upon the final tape. It may also be noted that the positions of the moving target indications on the final tape are the positions of the targets at the final scan of the area, assumed to be 30 seconds later than the first scan. This is by virtue of the fact that the first operation is really a preliminary erasing operation, the true target recording operation being the second operation.

After passing recording point B, the tape with its record of moving targets and with the fixed target indications eliminated, moves past the reproducing or pick-up magnet 61. As the magnetization of all of the erased or magnetically saturated regions is uniform, these regions do not produce any substantial response in the reproducing or pick-up magnet. But the transition from saturated to magnetically clear condition and back again as one of the unsaturated regions passes the reproducer generates a pulse, or perhaps two closely spaced pulses, in the reproducing magnet coil. This passes through the amplifier 36 and filter 37 to the elements of the organization which translate the impulse into a visible signal indication. The time constants and damping of the portion of the transmitting circuit from the reproducing coil 61 to the elements which translate the impulse into a visible signal may be made such that the two transition pulses representing the boundaries between the magnetic discontinuities of the signal area, if not too widely separated, may be translated in effect into a single pulse.

After moving past the pick-up magnet 61 which reproduces the resultant record, the tape continues past erasing magnet 62. The magnet 62 is energized by high frequency alternating current, say 50,000 cycles per second, and operates thoroughly to demagnetize the tape and clear it of any magnetic record. The tape then moves past recording point A where another cycle of operation starts. The recording magnets A and B and the reproducing and erasing magnets 61 and 62 are disposed along the same single stretch of the several convolutions of the complete length of tape.

Figure 2:
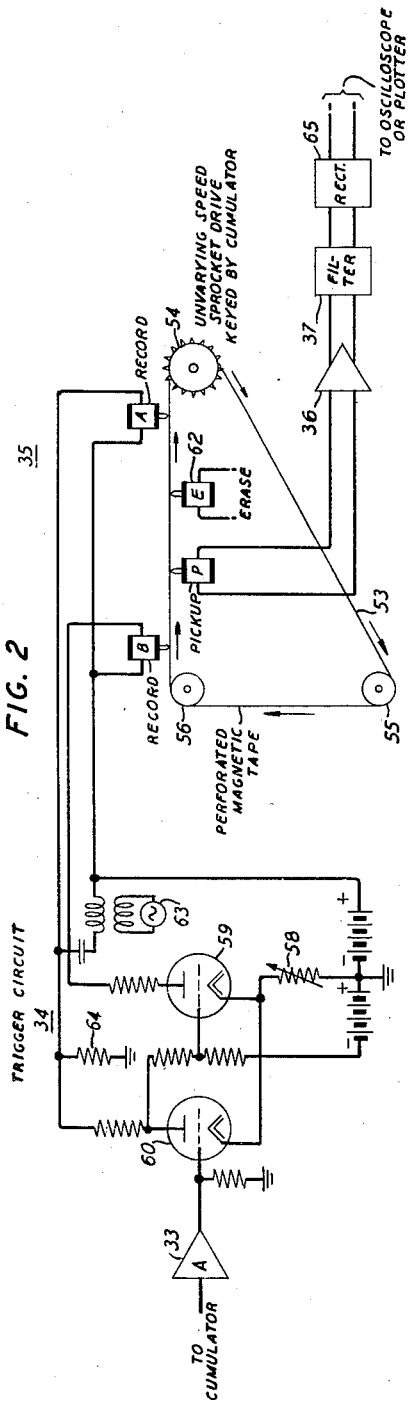

In the modification of the invention illustrated in Fig. 2 corresponding elements are identified by the same reference characters used in Fig. 1. The patterns made upon the tape by the operation of this form of the invention are illustrated in Fig. 7 under the title "Patterns Made by Fig. 2." It may here be noted that the showings of all of the tape patterns in Fig. 7 are merely illustrative as, of course, the magnetization of the tape does not produce any effect that is visible to the eye.

In the form of the invention illustrated in Fig. 2, and in the resultant patterns shown in Fig. 7, erasing is effected by magnetization of the tape to saturation, and the targets are represented by lengths upon which a tone is impressed rather than by clear spaces. Referring to Fig. 7, the action at operating point A is to magnetically saturate the tape during all signal intervals, and to impress a tone upon the tape during the intervals between signals. The first strip of the illustrative series of three in Fig. 7 shows the result upon the tape of the action at operating point A alone. The fixed and moving targets appear as saturated regions, and the intervals between them appear as regions bearing a tone. If the action at operating point B alone took place upon clear tape, it would produce an effect illustrated in the second strip, in which saturation is normally impressed upon the tape, but is omitted during the receipt of the signal. But the action at operating point B is upon identically the same length of tape that has previously had impressed on it the magnetic pattern shown in the first strip of the series. The composite effect of the two operations is shown in the third strip. As the fixed targets have not changed in position during the interval between the two scans, the omission of saturation at B coincides identically with regions that have already been saturated at B. But as the other targets are assumed to have moved in the interval between scans, the omissions of saturation at B now coincide with regions on the tape upon which a tone had been impressed at A. The resultant of the two actions is therefore as shown in the third strip of the series, in which the moving targets are represented as regions on the tape bearing a tone, whereas all other regions, including the fixed target regions saturated at A, are magnetically saturated.

The circuit whereby this is accomplished, as shown in Fig. 2, is one wherein recording magnet A is included in the plate circuit of tube 60 of the trigger circuit 34, while recording magnet B is included in the plate circuit of tube 59 of that circuit. During the receipt of the target signal, current passing in the plate circuit of tube 60 is sufficient to energize magnet A to its saturating condition. At the cessation of the target signal, plate current instantly ceases to flow in the tube 60; but there is a second path completed through a condenser and a secondary winding of a transformer the primary winding of which includes a source 63 of alternating current operating to produce a tone assumed in the present instance to be 6,000 cycles per second. This 6,000-cycle tone is impressed upon recording magnet A, together with a direct current bias that may be traced from the positive pole of one of the two direct current batteries of the trigger circuit by way of the recording magnet A and through a high resistance 64 back to ground and the negative pole of the battery. During the intervals therefore when the plate circuit of tube 60 is not conducting, this direct current bias is placed upon recording magnet A, together with the 6,000-cycle tone current.

During the no-signal interval when there is no plate current in tube 60, plate current is flowing in tube 59. This energizes recording magnet B sufficiently to saturate the tape. When the receipt of the signal triggers over to a conducting condition the plate circuit of tube 60, current instantly ceases to flow in the plate circuit of tube 59 and recording magnet B ceases its saturating action.

It may here be mentioned that recording, reproducing and erasing magnets such as used in the magnetic tape recording and reproducing system hereinbefore referred to as described in the September 1941 issue of the Bell Laboratories Record, pages 2 to 5, inclusive, are suitable for employment in the present system. These magnets have the following characteristics: They are wound to a resistance of approximately 90 ohms with about 1200 turns of wire, and have an inductance of about 35 millihenries. For saturating or erasing, the current flow through the winding is about 25 milliamperes. For signal recording the current is about 0.6 milliampere with a superposed two-milliampere direct current bias. The pole-piece surfaces are about 50 mils square and are in engagement with opposite flat surfaces of the magnetic tape which may be about two mils thick. The pole-pieces are staggered or offset so that the magnetic flux passes through the tape from one corner of one pole-piece to the directly opposite corner of the other pole-piece.

As has been described in connection with Fig. 7, the magnetic effect resulting from the consecutive action of operating magnets A and B is that the length of tape is entirely erased by magnetic saturation, except for the tone-bearing areas representing moving targets. As this tape passes the pick-up or reproducing coil 61, the tone intervals are reproduced, amplified in amplifier 36, filtered in filter 37, and thence pass to the rectifier 65 where the tone is rectified into direct current impulses that pass to the oscilloscope or plotter. The filter 37 in the system of Fig. 2 is preferably so designed as to pass the 6,000-cycle tone frequency together with its control signal sidebands, and to attenuate all other frequencies.

In the modified form of the invention illustrated in Fig. 3 the magnetic patterns made on the tape are those illustrated in Fig. 7 under the title "Patterns Made by Fig. 3." In this form of the invention the clear or demagnetized tape first has a tone uniformly recorded throughout its length, as shown on the first of the four strips of the series. The action of the magnets at operating points A and B is an erasing action. This is an erasure by high frequency alternating flux rather than by magnetic saturation. The action at operating point A is to erase the previously recorded tone during the receipt of fixed or moving target signals, and to omit the erasing operation during the intervals between signals. The effect of the action at operating point A is illustrated in the second strip of the series. The result of the action at operating point B is shown in the third strip of the series. This is upon the assumption that the action at point B is exercised upon an unmodified strip of tape on which the tone has been uniformly recorded. The action at B is to erase the tone normally, but to omit the erasure during intervals when signals are being received. But the length of tape that passes B is identically the same length upon which the magnet at B has already operated. In the case of the fixed targets the erasing operation at B is suspended over the corresponding fixed target regions of the tape. But these regions have already had the tone erased from them in the action that took place at operating point A. Therefore these regions remain erased. But in the case of the moving targets the corresponding regions on the tape have been displaced as a result of the movement of the targets in the interval between scans. Consequently in the case of the moving targets the regions where erasure is suspended at B are regions that were left unerased by the action at A. The result is that the tape after passing operating point B bears the pattern shown in the fourth strip of the series, in which everything has been erased except the regions corresponding to the position of moving targets at the instant of the last scan.

The manner in which this result is accomplished is shown by the circuit of Fig. 3. As shown in Fig. 3, a tone recording magnet 66 is arranged to engage the tape, in addition to pick-up or reproducing magnet 61 and erasing magnet 62, in the stretch of tape that lies between recording magnet B and recording magnet A, the latter two magnets, as has been explained, being in this case also erasing magnets. After the erasing operation has been performed upon the tape by erasing magnet 62 upon the completion of the operating cycle, a tone, say 6,000 cycles, is uniformly recorded upon the tape by recording magnet 66. In accordance with standard practice in tape recording, the magnet 66 has impressed upon it a small direct current bias simultaneously with the tone. Thereafter the operations of the erasing magnets A and B are such as to produce a final magnetic pattern on the tape as shown in Fig. 7. After the two erasing operations have been completed by magnets A and B, the resultant tape bearing upon it a series of tone areas representing moving targets passes the pick-up or reproducing magnet 61. The reproduced tone passes by way of an amplifier and a filter, which may conveniently be designed to pass the 6,000-cycle tone frequency with its sidebands to a rectifier where the alternating tone frequencies are rectified and pass as direct current impulses, representing moving targets, to the oscilloscope or plotter.

The circuit of Fig. 3 illustrates the manner in which the magnets A and B are operated to perform successive tone erasing functions. In this case the trigger circuit 34 is employed, not to control power for the direct operation of the magnets A and B, but rather to control the abruptly changing trigger potentials for the operation of amplifiers 67 and 68, preferably of the push-pull type, for the application of erasing frequencies to the magnets A and B. The trigger circuit 34 is the same as that previously discussed, but has been redrawn more clearly to show the relations of the plate current resistances of the trigger circuit with corresponding potentiometer resistances 69 and 70 from which potentials are derived for operating the push-pull amplifiers 67, 68. The two trigger circuit batteries, as that circuit is described in the publication to which reference has already been made, are of equal and opposite potentials with respect to ground. Therefore in a network such as that shown in Fig. 3, consisting of the two batteries, the two plate circuit resistances and the two potentiometer resistances 69 and 70, there is a point along resistance 69 when the tube 60 is not conducting the potential of which is substantially zero or ground potential; and similarly, there is such a zero or ground potential point along the potentiometer resistance 70 when tube 59 is not conducting. When the trigger action of the circuit causes one or the other of the tubes to conduct, the potential at this zero point along the corresponding potentiometer resistance suddenly is driven negative by a very substantial amount. By connecting the grids of the tubes of the corresponding push-pull amplifiers 67, 68 to these two points each amplifier is abruptly changed from an operating to a blocking condition when the corresponding tube of the trigger circuit commences to conduct current in its plate circuit. By choosing the point of connection with the potentiometer resistances 69 and 70, connecting each of these points with ground through a high resistance 71, 72, as shown, and by choosing the point of connection along these resistances to the grids of each of the push-pull amplifiers, any desired fraction of the abruptly shifted potential may be made available for the operation of the push-pull circuits. Preferably the resistance of each of the potentiometer arms 69 and 70 is made high relative to its corresponding trigger circuit plate current resistance so that these arms have no substantial effect upon the proper functioning of the trigger circuit.

With the circuit as shown in Fig. 3, under the no-signal condition the plate circuit of tube 60 is open and that of tube 59 is conducting. Consequently, under these conditions the potential of the chosen point along potentiometer arm 69 is approximately zero and the potential at the chosen point along potentiometer arm 70 is strongly negative. These potentials are such that under this condition push-pull amplifier 67 is operating and push-pull amplifier 68 is blocked. When either amplifier is operating it acts to apply an alternating erasing current, say 50,000 cycles, from a source 73 to the particular erasing magnet which is connected with its output circuit, and when blocked to withdraw such erasing current from the associated magnet A or B. The output of push-pull amplifier 68 is connected with erasing magnet A and the output of push-pull amplifier 67 is connected with erasing magnet B. As shown, the erasing frequency is communicated to the series input circuit of each of the two amplifiers, and the control potentials from the potentiometer arms 69 and 70 of the trigger circuit are applied to the parallel grid circuits of the two amplifiers respectively.

It follows therefore that at operating point A the erasing magnet is normally inert because amplifier 68 is normally blocked by the large negative potential communicated to its grids from potentiometer arm 70 during the normal conducting condition of trigger tube 59. But the receipt of the signal instantly blocks tube 59 and raises the potential imparted to the grids of amplifier 68 to zero or such potential as conforms with that required for the operation of amplifier 68. The receipt of the signal therefore makes amplifier 68 operative to apply to erasing magnet A high frequency erasing current from the alternating source 73.

In the case of erasing magnet B, this magnet is normally energized to apply erasing flux to the tape. This is because during the intervals when no signals are being received the potential communicated from the chosen point on potentiometer arm 69 to the grids of amplifier 67 is such as to correspond with the operating point of the amplifier characteristic. Therefore under this normal condition amplifier 67 is operative to supply erasing magnet B with high frequency erasing current from the source 73. Upon the receipt of a signal, however, the plate circuit of trigger tube 60 immediately becomes conductive, the potential at the chosen point of potentiometer arm 69 is driven strongly negative, and amplifier 67 is blocked to interrupt the passage of erasing current to erasing magnet B. By employing amplifiers 67 and 68 of the push-pull type, the inductive effects in the repeating coil windings in the output circuits of each amplifier are balanced out so that the abrupt blocking of the amplifier does not produce a large magnitude transient in the magnets A and B connected with the amplifier output circuits.

Figure 4:
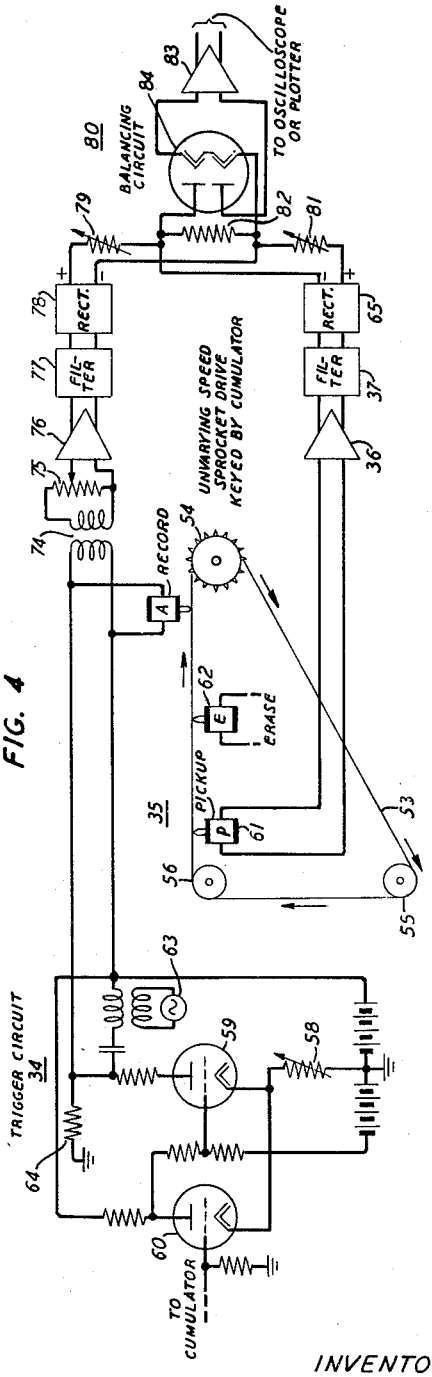

In the modified forms of the invention illustrated in Figs. 4 and 5, the cancellation that results in the elimination of the fixed target indications occurs not in the magnetic tape itself but in a balancing circuit simultaneously subjected to a series of signals directly received from the area being scanned and a corresponding series of signals that has resulted from a preceding scan of the area and has been recorded on and is reproduced from a corresponding unit length of tape.

Referring particularly to the system of Fig. 4, the record made upon the tape that is subsequently used to balance incoming signals from the same area is shown on Fig. 7 under the heading "Pattern Made by Fig. 4". In this pattern the signals of all targets, fixed and moving, are recorded as tone areas on the tape, while the intervals between targets are magnetically saturated. The manner in which this result is accomplished may be seen by reference to Fig. 4. The tape runs successively past the recording magnet A, the pick-up magnet 61 and the erasing magnet 62. The recording magnet A is included serially in the plate circuit of the trigger tube 59. Under no-signal conditions the plate circuit of tube 59 is conducting, and the current that passes through recording magnet A is sufficient to magnetically saturate the tape. When a signal is received, tube 59 immediately opens its plate circuit and the saturating condition of magnet A is terminated. But the opening of the plate current path through tube 59 permits a tone frequency, say, 6,000 cycles, to become operative on recording magnet A by way of the secondary winding of the transformer in the primary winding of which the alternating current tone source 63 is connected. At the same time a small amount of biasing direct current is permitted to pass through recording magnet A by way of the high resistance 64.

The fixed and moving target signals from the trigger circuit 34 are recorded on the moving tape by the recording magnet A and are simultaneously transmitted to a balancing circuit 80 where they are met by a corresponding series of signals reproduced from the tape, after the predetermined delay interval, by the pickup magnet 61. Various forms of balancing circuit may be used. The form illustrated comprises a common resistance 82 and two adjustable resistances 79 and 81, each individual to its particular branch of the balancing circuit. The directly transmitted signals pass from the trigger circuit output through the transformer 74 and high resistance variable gain device 75, to an amplifier 76. The output of this amplifier passes to the rectifier 78 through a filter 77, which may be so organized as to pass the 6,000-cycle tone frequency with its signal sidebands and to attenuate other frequencies. The unidirectional impulses from rectifier 78 pass into the balancing circuit through the adjustable resistance 79. The path over which the recorded and reproduced signals pass to the balancing circuit 80 extends from the pick-up or reproducing magnet 61 to the amplifier 36, the filter 37, also arranged to pass the tone and its signal sidebands, and the rectifier 65, which converts the signals to direct current impulses. These pass into the balancing circuit by way of the adjustable resistance 81.

The movement of the unit length of tape upon which the fixed and moving target signals have previously been recorded by magnet A is so timed that the duration of movement of this length past the reproducing magnet 61 exactly coincides with the duration of the series of directly transmitted signals received from the same scanning area. The rectifiers 78 and 65 therefore deliver to the balancing circuit 80 a series of unidirectional impulses that exactly coincide in point of time with respect to signals from targets that have not changed their position in the interval between two scans, but which do not coincide as to signals from targets that have changed in position in this interval. The polarities of the output circuits of the two rectifiers 78 and 65 are so arranged with respect to the balancing circuit as to produce balanced potentials across the resistance 82 for fixed target signals, but unbalanced potentials with respect to moving target signals. The terminals of resistance 82 are connected with the input circuit of the direct current amplifier 83, which may be of the "long tailed pair" type previously referred to, and the output of this amplifier leads to the oscilloscope or plotter. Complete amplitude balance as to corresponding signals between fixed targets may be secured by adjustment of the adjustable resistances 79 and 81.

The only signals which pass from the balancing circuit 80 to the amplifier 83 are those which are unbalanced and therefore represent moving targets. But each moving target is represented in the output of the balancing circuit by two unidirectional signal pulses, one of which is the delayed pulse recorded on and reproduced from the magnetic tape, and the other of which is the directly received signal impulse that represents the position of the target at the time of the latter of the two scans. To avoid confusion, therefore, and to present on the oscilloscope or plotter an indication of the moving target in its last-scanned position, it is desirable to suppress the unbalanced moving target signal that is obtained by way of the magnetic tape. This may conveniently be done by the interposition of a unidirectionally conducting device such as the vacuum tube rectifier 84 between the balancing circuit 80 and the amplifier 83. This may be a paired device with one of the unidirectional conducting paths in each of the two conductors from the balancing circuit to the amplifier. These unidirectional paths are so poled as to suppress the passage from balancing circuit to amplifier of the positive moving target signal impulses received through the medium of the magnetic tape, and to permit the passage to the amplifier of the positive moving target signal impulse received directly. As a result the signal indications that appear on the oscilloscope or plotter are those representing the location of the moving targets in their last-scanned position.

Referring now to the system of Fig. 5, the cancellation of fixed target signals in the electrical balancing circuit is accomplished by means of a magnetic tape record on which the fixed and moving target signals are represented by tone bearing areas on the tape, while the spaces between signals are magnetically clear areas. This is indicated under the title "Pattern Made by Fig. 5" in Fig. 7 of the drawing.

In the system of Fig. 5 the magnetic tape 53 runs successively past the recording magnet A, the pick-up magnet 61 and the erasing magnet 62. The recording magnet A is connected, in parallel with the branch extending directly to the balancing circuit, in the output circuit of the push-pull amplifier 67. A circuit 85 for applying a direct current bias to the recording magnet A is also connected across the terminals of this magnet. The biasing circuit may consist of a source of direct current in series with resistance, say 10 volts and 5,000 ohms, to give a biasing current of about two milliamperes.

The 6,000-cycle tone source 63 is connected through a transformer with the series input circuit of the push-pull amplifier, and the parallel input path to the grids of the two tubes is connected, through the potential regulating resistance 72 if desired, to the selected point on the potentiometer branch 70 of trigger circuit 34. As has been described, this selected point is at practically zero potential during the transmission of a target signal to the trigger circuit, and is held at a strongly negative potential normally when no signal is being received by the conducting path established through the plate circuit of trigger tube 59 during such time.

As a result, during the normal or no-signal condition the push-pull amplifier 67 is blocked to prevent the communication of 6,000-cycle tone to recording magnet A. When the signal is received, the opening of the conducting path through the plate circuit of tube 59 and the simultaneous closing of the conducting path through the plate circuit of tube 60 establishes the operating condition of the amplifier 67 and causes the transmission of tone from the source 63 to the recording magnet A.

The canceling of the fixed target signal impulses in the balancing circuit 80 occurs in the same manner as has been described in connection with the operation of the system of Fig. 4. That is, the directly received tone after passing through the elements 74, 75, 76 and 77 is converted into a unidirectional impulse in rectifier 78, at the same instant that the recorded tone reproduced by pick-up magnet 61 and passed through the elements 36 and 37 produces a corresponding unidirectional impulse in the rectifier 65. These impulses are balanced out in the balancing circuit 80. But the moving target signals, being displaced in point of time by the delay introduced in the moving tape record, are not balanced and appear as two successive positive impulses in the output of the balancing circuit 80. The impulse that has its origin in the magnetic tape record is suppressed in the corresponding unidirectionally conducting path through the rectifier 84, while the impulse that has its origin in the directly received signal is permitted to pass through to the amplifier 83.

In the modifications of the invention hereinbefore described, in each case a trigger circuit is interposed in the path of the signals from the cumulator to the recording and balancing elements to establish a critical amplitude level for the signals, so that those falling below this level will be suppressed and only the signals reaching or exceeding the critical level will be transmitted. This has certain advantages in eliminating the marginal operating zone and causing such signals as reach the recording and balancing apparatus to be positive and clean-cut in their operation of the apparatus. However, it may be desirable under certain circumstances to eliminate the critical level established by the trigger circuit, and to permit all signals from the cumulator to pass to the recording and balancing circuits and to affect these circuits in proportion to their varying amplitudes. A circuit for accomplishing this result is illustrated in Fig. 6, and the magnetic record that it makes on the tape is indicated in Fig. 7 under the title "Pattern Made by Fig. 6." This record is one in which the magnitudes of the magnetic effect are depicted as being proportional to the amplitudes of the cumulator signals at all points. Referring to Fig. 6, the charges stored in the cumulator and representing reflected energy from successive radial sections of the range scan are transmitted to a direct current amplifier 33 preferably of the "long tailed pair" type. From the output of this amplifier the amplified charges pass to the input circuit of a push-pull amplifier 67 which transmits a tone frequency from the source 63 to the recording and balancing circuits at amplitudes varying in proportion to the amplitudes of the charges imparted to the input circuit of amplifier 67 by amplifier 33. The grid circuit of the push-pull amplifier 67 is normally set at an operating point in the amplifier characteristic such that this proportionality between the amplitude of the input signals and the output tone is maintained.

The circuit of Fig. 6 is shown to be capable of operating in two ways, depending upon the positions occupied by the switches 86, 87 and 88. Assuming the switches are in the positions they are shown to occupy in the drawing, the tone varying in amplitude in accordance with the signal amplitudes is transmitted to recording magnet A, a biasing current being at the same time superposed upon the magnet by the source of current and resistance 85. As the unit length of tape upon which the signal records of a particular scan have been recorded reaches the pick-up magnet 61, the varying magnetically recorded amplitudes are converted into correspondingly varying electrical tone amplitudes, which pass by way of the switch 88, amplifier 36 and filter 37 to the rectifier 65 where they are translated into unidirectional currents of correspondingly varying amplitudes.

During the same time interval in which the unit length of tape is passing pick-up magnet 61, exactly the same azimuthal area is again being scanned and the tone, varying in amplitude in accordance with the amplitudes of the signals from the cumulator, is passing from the output of amplifier 67 through transformer 74, variable gain device 75, amplifier 76, and filter 77 to rectifier 78, where the varying amplitude tone frequencies are translated into unidirectional current of correspondingly varying amplitudes. Assuming a proper adjustment of the adjustable resistance arms of the balancing circuit, all signals exactly coincident in point of time, as from fixed targets, that reach the balancing circuit 80 are canceled out. Those that are not exactly coincident in point of time pass through vacuum tube rectifier 84, where those which originated in the magnetic tape record are suppressed and those which originated in the directly incoming circuit pass to the amplifier 83, and are transmitted to the oscilloscope or plotter where they appear as moving target indications.

In the modification of the invention described above, instead of a fixed critical level which the potentials of the cumulator charges have to equal or exceed in order to be transmitted through the organization and appear as signals, the level is one which varies in accordance with the signal amplitudes themselves. Thus, if in the interval between scans an object appears and adds sufficient reflected energy to that reflected during the preceding scan from a stationary object at the same range distance, the increment of energy will prevent cancellation in the balancing circuit and produce a pulse indicating the presence of the moving object at this range distance.

The circuit of Fig. 6 may be employed to make a master record of the entire area scanned, which record thereafter may be employed continuously to balance out signals from objects in the area the positions of which have not changed. Assuming, as has previously been done, that the length of the endless magnetic tape 53 is 120 feet, that is, 60 two-foot unit sections each corresponding with continuously successive six-degree scans in azimuth, if a magnetic record is made on this tape of one complete 360-degree scan in azimuth at a time so chosen that there are no moving targets in the area scanned, then this fixed target record of the area may be repeatedly reproduced in exact synchronism with the subsequent continuous scanning of the area to cancel out from each of the subsequent scans all signals coinciding with signals from fixed targets, or from the range distance of any fixed target the amplitude of the signal from which has not changed.

In the making of such a master record, the switches 86 and 88 are opened and the switch 87 is closed, so as to demagnetize the tape and clear it of previous signals as it passes the erasing magnet 62. The switch 87 is then opened and the switch 86 is closed for a length of time exactly equal to one complete scan of 360 degrees in azimuth, the selected time being one in which there are no moving targets in the area scanned. The switch 88 is then closed and the switch 86 opened, the switch 87 remaining open so that the record placed upon the tape is thereafter not erased. If desired, the switch 86 in its alternative position may substitute an equivalent network 89 for the recording circuit that its movement disconnects. Thereafter the balancing operation of the circuit of Fig. 6 is as already has been described, the series of fixed target signals recorded on the 60 unit lengths of the tape being delivered to the balancing circuit 80 in exact synchronism with the directly received signals as the corresponding azimuthal intervals thereafter are scanned.

Obviously, the principle embodied in the system of Fig. 6 for effecting partial or complete balancing and cancellation of signals by means of directly received and tape recorded impulses applied to a balancing circuit, may be realized by applying both such series of impulses to the magnetic tape for partial or complete balancing and cancellation in the resultant tape record. This may be accomplished by an organization such as that illustrated in Fig. 3, except that the input circuits of the push-pull amplifiers 67 and 68, instead of being connected with amplifier 33 through the medium of a trigger circuit and potentiometer network, are connected directly with the amplifier 33 in such a way that the grid circuits of amplifiers 67 and 68 are oppositely operated upon by potentials the amplitudes of which vary proportionately to the varying amplitudes of the signals. The resultant tape record thus made is one in which there may be incomplete cancellation and therefore a resultant target signal in case of the appearance of a moving target at the same range distance from the antenna as a fixed target.

The various forms of the invention have been described upon the basis of certain assumed factors with respect to the scanning rate of the exploratory area, range distance scanned, number of elements in the cumulator, length and speed of movement of the magnetic recording tape, unit recording length of tape corresponding to each unit range scan, recording speed and time constants of the magnets that operate upon the tape, and time constants of other elements in the operating circuits. Assuming that greater tape length, higher tape speed at constant unvarying velocity and increased operating rates for the tape magnets are possible, together with shorter tape lengths per unit scan, the capabilities of the various embodiments of the invention described are obviously increased with respect to exact balancing over the range scanned; and the capabilities may still further be extended in this respect by multiplication of the cumulator elements corresponding with a single range sweep. The time constants of charge and discharge of the cumulator elements must, of course, be adjusted in one case to the frequency rate at which the charges are cumulated and in the other case to the length of time available at the operating rate of the cumulator for complete discharge of each cumulated impulse into the recording and balancing circuits.

What is claimed is:

1. In a radar system, the method of discriminating between fixed and moving target indications, which consists in making two successive identical range scans with a predetermined delay interval between the two scans, making superposed linear magnetic records of the target signal indications of the two successive range scans, causing one record to cancel the effect of the other record at all points of said records where the fixed target signal indications of the two records exactly coincide, and reproducing the uncanceled regions to produce moving target signal indications corresponding with points on the record where coincidence and resultant cancellation has not occurred.

2. In a radar system the method of discriminating between fixed and moving target indications, which consists in making two successive identical range scans with a predetermined delay interval between the two scans, magnetically recording indications representing all fixed and moving targets lying within the radius of said scan, causing the second scan to magnetically superpose a second record of signal indications of the same fixed and moving targets, and causing the superposed recording actions of the two scans to cancel all signal indications where exact coincidence occurs as a result of absence of movement between scans on the part of certain of said targets, whereby there are left recorded after the second scan only such signal indications as correspond with targets that have moved in the interval.

3. In a radar system the method of discriminating between fixed and moving target indications, which consists in making successive identical scans of a given area at a high frequency, accumulating and storing the resultant reflected energy pulses, transmitting said pulses at a rate that is slow as compared with said scanning frequency whereby said scans are converted into equivalent scans at a lower frequency causing one equivalent scan to make a record of all fixed and moving targets lying in the area scanned, reproducing the recorded signal indications and balancing the reproduced indications against the corresponding signal indications received as a result of a second equivalent scan to cancel out the signals received from targets that have been stationary during the interval between scans, utilizing the energy of the unbalanced signals to produce moving target indications, and continuously erasing each record after it has served its purpose.

4. In a radar system, the method of discriminating between fixed and moving target indications, which consists in scanning a certain area at a high frequency, accumulating and storing the resultant reflected energy pulses, transmitting said pulses at a rate that is slow as compared with said scanning frequency, whereby said scans are converted into equivalent scans at a lower frequency, making a linear record from one lower frequency scan of the reflected energy from fixed and moving targets lying in said area, balancing target signal energy reproduced from said record against the corresponding target signal energy resulting from a second lower frequency scan to produce cancellation of the signals from fixed targets, and utilizing the unbalanced energy to indicate the position of moving targets in said area.

5. In a radar system, the method of discriminating between fixed and moving target indications, which consists in scanning at a high frequency a certain area at a time when there are no moving targets in said area, accumulating and storing the resultant reflected energy pulses, transmitting said pulses at a rate that is slow as compared with said scanning frequency, whereby said scans are converted into equivalent scans at a lower frequency making a record from one lower frequency scan of the reflected energy from the fixed targets lying in said area to serve thereafter as a master control record for said area, balancing the target signal energy resulting from a second lower frequency scan against the fixed target signal energy reproduced from said master control record to produce cancellation of the signals from fixed targets, and utilizing the unbalanced energy to indicate the position of moving targets in said area.

6. In a radar system, the method of discriminating between fixed and moving target indications, which consists in continuously and repeatedly scanning an exploratory area in azimuth and range, accumulating and storing the resultant reflected energy pulses, transmitting said pulses at a rate that is slow as compared with said scanning frequency whereby said scans are converted into equivalent scans at a lower frequency, making a record of energy reflected from fixed targets lying in said exploratory area during one complete lower frequency scanning cycle of the area in azimuth and range, reproducing said recorded energy in exact synchronism and phase with each subsequent lower frequency scan of said exploratory area, balancing the reflected target signal energy resulting from each successive lower frequency scan of the area against the fixed target signal energy reproduced from said record to produce cancellation of the signals from fixed targets, and utilizing the unbalanced energy to indicate the position of moving targets in said area.

7. In a radar system, the method of discriminating between fixed and moving target indications, which consists in continuously and repeatedly scanning an exploratory area in azimuth and range, accumulating and storing the resultant reflected energy pulses, transmitting said pulses at a rate that is slow as compared with said scanning frequency whereby said scans are converted into equivalent scans at a lower frequency, making a record of energy reflected from targets lying in said exploratory area during each complete lower frequency scanning cycle of the area in azimuth and range, reproducing the recorded energy of each preceding lower frequency scanning cycle in exact synchronism and phase with each subsequent lower frequency scanning cycle of said exploratory area, balancing the reflected target signal energy resulting from each successive lower frequency scanning cycle of the area against the target signal energy reproduced from the record of the preceding lower frequency scanning cycle to produce cancellation of the signals from fixed targets, and utilizing the unbalanced energy to indicate the position of moving targets in said area.

8. In a radar system, the method of discriminating between fixed and moving target indications, which consists in continuously and repeatedly scanning an exploratory area in azimuth and range, accumulating and storing the resultant reflected energy pulses, transmitting pulses at a rate that is slow compared with said scanning frequency whereby said scans are converted into equivalent scans at lower frequency, translating the signal energy reflected from targets lying in said exploratory area during each complete lower frequency scan of the area in azimuth and range into a series of signals varying in duration and amplitude in accordance with the duration and amplitude of the reflected energy from each target, making a record of said series of signals corresponding with each complete lower frequency scan of the area, reproducing said recorded series of signals of each preceding scan in exact synchronism and phase with each subsequent lower frequency scan of said exploratory area, balancing the energies of the series of signals of each successive scan against the reproduced energies of the series of signals of the preceding scan to produce cancellation of the signals corresponding with fixed targets, and utilizing the unbalanced signal energies to indicate the position of moving targets in said area.

9. In a radar system, the method of discriminating between fixed and moving target indications, which consists in continuously and repeatedly scanning an exploratory area, accumulating and storing the resultant reflected energy pulses, transmitting said pulses at a rate that is slow as compared with said scanning frequency whereby said scans are converted into equivalent scans at a lower frequency, translating the signal energy reflected from targets lying in said area during each complete lower frequency scan of the area into a series of signals varying in duration and amplitude in accordance with the duration and amplitude of the reflected energy of each target, making a record of said series of signals corresponding with each complete lower frequency scan of the area, rectifying the signals of said recorded series, balancing the rectified recorded signals against similarly rectified signals directly received as a result of the next succeeding lower frequency scan to produce cancellation of the signals from fixed targets, and utilizing the unbalanced rectified energy to indicate positions of moving targets in said area.

10. In a radar system for discriminating between fixed and moving targets, means for repeatedly scanning a particular azimuthal angle, means for magnetically operating on a unit length of magnetic tape under the control of signals reflected from objects lying in said angle, means for moving said tape at a critical unvarying velocity such that the target signals of a subsequent scan of the same azimuthal angle magnetically operate upon the same said unit length of tape, means whereby the successive scanning operations are so performed that all parts of the tape record where the positions of the recorded signals coincide or where there are no signals are in a magnetically erased condition, and means for reproducing the resultant record to indicate the position of moving targets in the particular angle scanned.

11. In a radar system for discriminating between fixed and moving targets, means for repeatedly scanning a particular azimuthal angle, means for accumulating and storing the resultant reflected energy pulses and for transmitting them at a rate which is low as compared with the scanning frequency, whereby said scans are converted into equivalent scans at a lower frequency, means for recording from said lower frequency scans on a unit length of magnetic tape signals reflected from objects lying in said angle, means for reproducing from said unit length of tape the recorded signals in synchronism and phase with a subsequent lower frequency scanning of said particular angle, means for balancing the reproduced signals against the directly received signals of the subsequent scan to cancel out the signals from fixed targets, and means for utilizing the uncanceled signals to indicate the positions of moving targets in said particular azimuthal angle.

12. In a radar system for discriminating between fixed and moving targets, means for repeatedly scanning a particular azimuthal angle, means for accumulating and storing the resultant reflected energy pulses and for transmitting said pulses at a rate that is slow as compared with said scanning frequency whereby said scans are converted into equivalent scans that are lower in frequency, means for recording from said lower frequency scans on a unit length of magnetic tape signals reflected from objects lying in said angle, balancing means for utilizing the recorded signals on said unit length of tape in synchronism and phase with a subsequent lower frequency scanning of said particular angle to cancel out the signals received from fixed targets, and means for utilizing the uncanceled signals to indicate the positions of moving targets in said angle.

13. In a radar system for discriminating between fixed and moving targets, means for repeatedly scanning a particular azimuthal angle, means for accumulating and storing the resultant reflected energy pulses and for transmitting said pulses at a rate that is slow as compared with said scanning frequency whereby said scans are converted into equivalent scans at a lower frequency, means for recording from said lower frequency scans on a unit length of magnetic tape signals reflected from objects lying in said angle, means for utilizing the recorded signals on said unit length of tape in synchronism and phase with a subsequent lower frequency scanning of said particular angle to cancel out the signals received from fixed targets, balancing means for utilizing the uncanceled signals to indicate the positions of moving targets in said angle, and means for continuously magnetically erasing the signals recorded on said tape after they have served their purpose in order to prepare the tape for the recording of a new series of signals.

14. In a radar system for discriminating between fixed and moving targets, means for repeatedly scanning a particular azimuthal angle, means for accumulating and storing the resultant reflected energy pulses and for transmitting said pulses at a rate that is slow as compared with said scanning frequency whereby said scans are converted into equivalent scans at a lower frequency, an endless loop of magnetic tape, means for causing the continuous movement of said tape at an unvarying velocity, means for recording from said lower frequency scans on a unit length of said tape signals reflected from objects lying in said azimuthal angle, balancing means for utilizing the recorded signals on said unit length of tape in synchronism and phase with a subsequent lower frequency scanning of said particular angle to cancel out the signals received from fixed targets, and means for continuously magnetically erasing the signals recorded on said tape after they have served their purpose in order to prepare the tape for the recording of a new series of signals.

15. In a radar system for discriminating between fixed and moving targets, means for repeatedly scanning the entire exploratory area in a recurrent succession of angular azimuthal scans, an endless loop of magnetic tape of a length sufficient to provide a unit length for each angular scan in a complete azimuthal cycle, means for causing the continuous movement of said tape at an unvarying velocity, means for recording on each unit length of said tape signals reflected from objects lying in the corresponding azimuthal angle, means for making each unit length operative during the time the corresponding azimuthal angle is again being scanned to cancel out the signals received from fixed targets lying in the corresponding angle, and means for continuously magnetically erasing the signals recorded on each unit length of said tape after they have served their purpose.

16. In a radar system for discriminating between fixed and moving targets, means for successively scanning a particular angle of the exploratory area, means for accumulating and storing the resultant reflected energy pulses and for transmitting said pulses at a rate that is slow as compared with said scanning frequency whereby said scans are converted into equivalent scans at a lower frequency, means for recording from said lower frequency scans on a unit length of magnetic tape signals reflected from objects lying in said angle, means for reproducing from said unit length of tape the recorded signals during a subsequent lower frequency scan of said particular angle, means for balancing the reproduced signals against the directly received signals of the subsequent scan to cancel out the signals from fixed targets, means for suppressing unbalanced recorded and reproduced signals, and means for utilizing the unbalanced and uncanceled directly received signals to indicate the position of moving targets in said particular angle scanned.

17. In a radar system for discriminating between fixed and moving targets, means for successively scanning a particular angle of the exploratory area, a magnetic surface proportionate in length to the range distance in said angle, means operating during one scan of said angle to produce a magnetically erased condition of said magnetic surface over all regions corresponding with range-positions of targets in said angle, means operating during a subsequent scan of said angle to produce a magnetically erased condition of said surface over all regions corresponding with range positions where there are no targets, and means thereafter responsive to unerased regions on said surface to produce signal indications representing targets that have moved in the interval between scans.

18. In a radar system for discriminating between fixed and moving targets, means for successively scanning a particular angle of the exploratory area, a section of magnetic tape proportionate in length to the range distance in said angle, means operating during one scan of said angle to produce a magnetically erased condition of said tape over all regions corresponding with range positions where there are targets, means operating during a subsequent scan of said angle to produce a magnetically erased condition of said tape over all regions corresponding with range positions where there are no targets, and means thereafter responsive to unerased regions on said tape to produce signal indications representing targets that have moved in the interval between scans.

19. In a radar system for discriminating between fixed and moving targets, means for successively scanning a particular angle of the exploratory area, a section of magnetic tape proportionate in length to the range distance in said angle and having a signal uniformly recorded thereon, means operating during one scan of said angle to magnetically erase from said section of tape all signal regions corresponding with range positions in which there are targets, means operating during a subsequent scan of said angle to magnetically erase from said section of tape all signal regions corresponding with range positions where there are no targets, and means thereafter responsive to unerased signal regions on said tape to produce signal indications representing targets that have moved in the interval between scans.

20. In a radar system for discriminating between fixed and moving targets, means for successively scanning a particular angle of the exploratory area, a section of magnetic tape proportionate in length to the range distance in said angle, means operating during one scan of said angle to produce a magnetically erased condition of said tape over all regions of said tape corresponding with range positions where there are targets and to record a signal over all regions corresponding with range positions where there are no targets, means operating during a subsequent scan of said angle to produce a magnetically erased condition of said tape over all regions corresponding with range positions where there are no targets, and means thereafter responsive to unerased signal regions on said tape to produce signals representing targets that have moved in the interval between scans.

21. In a radar system, the method of continuously discriminating between fixed and moving targets, which consists of making a continuous succession of identical scans of the same area, the identical scans having exactly the same time durations and following each other at the same predetermined time intervals, accumulating and storing the resultant reflected energy pulses and transmitting said pulses at a rate that is low as compared with said scanning frequency whereby said scans are converted into equivalent scans at a lower frequency, subjecting the series of electrical echoes of each lower frequency scan to a delay equal to the lower frequency time interval corresponding to said time interval to superpose them exactly upon corresponding lower frequency directly received echoes of the next succeeding scan, causing the cancellation of superposed echoes, and causing uncancelled echoes of successive scans to produce target signal indications.

22. In a radar system, the method of discriminating between fixed and moving objects, which consists of making a series of scans of identical duration of the same area, the start of a succeeding scan of said series following the start of the immediately preceding scan by a certain time interval, accumulating and storing the resultant reflected energy pulses and transmitting said pulses at a rate that is slow as compared with said scanning frequency whereby said scans are converted into equivalent scans at a lower frequency, subjecting the electrical echoes of the preceding lower frequency scan to a delay equal to the lower frequency time interval corresponding to said time interval, superposing the delayed echoes of the preceding scan on the echoes of the second lower frequency scan, causing cancellation of electrical effects where there is exact superposition of corresponding echoes of the two scans, and causing electrical effects uncancelled by absence of complete superposition to produce target signal indications.

23. In a radar system, the method of discriminating between fixed and moving objects which consists of making a series of identical duration scans of a given area to produce electrical echo patterns of all fixed and moving objects in said area, the start of a succeeding scan of said series following the start of a preceding scan by a certain time interval, accumulating and storing the resultant reflected energy pulses and transmitting said pulses at a rate that is slow as compared with said scanning frequency whereby said scans are converted into equivalent scans at a lower frequency, subjecting the echo pattern of the preceding lower frequency scan to a delay equal to the lower frequency time interval corresponding to said interval, and superposing the delayed pattern of the preceding lower frequency scan upon the undelayed pattern of the succeeding lower frequency scan to produce cancellation of the electrical effects of all echoes except those where there is absence of exact superposition.

24. In a radar system, the method of continuously discriminating between fixed and moving objects, which consists in making a continuous succession of scans of a given area, the successive scans being of identical duration and recurring at a definite time interval, accumulating and storing the resultant reflected energy pulses and transmitting said pulses at a rate that is slow as compared with said scanning frequency whereby said scans are converted into equivalent scans at a lower frequency, causing each lower frequency scan to produce an undelayed and a delayed echo pattern of all fixed and moving objects in said area, the delay of the lower frequency delayed pattern being equal to the lower frequency time interval corresponding to said time interval, and superposing the delayed pattern of each lower frequency scan upon the undelayed patern of the next succeeding lower frequency scan to produce cancellation of the electrical effects of all echoes except those where there is an absence of exact superposition.

25. In a radar system, the method of continuously discriminating between fixed and moving objects, which consists in making a continuous succession of scans of a given area, the successive scans being of identical duration and recurring at a definite time interval, accumulating and storing the resultant reflected energy pulses and transmitting said pulses at a rate that is slow as compared with said scanning frequency whereby said scans are converted into equivalent scans at a lower frequency, causing each lower frequency scan to produce an undelayed and a delayed echo pattern of all fixed and moving objects in said area, the delay of the lower frequency delayed pattern being equal to the lower frequency time interval corresponding to said time interval, superposing the delayed pattern of each lower frequency scan upon the undelayed pattern of the next succeeding lower frequency scan, and controlling the production of signals in accordance with the presence or absence of exact positional coincidence between corresponding echoes of the two superposed patterns.

26. A radar system for continuously discriminating between fixed and moving objects comprising means for making a continuous succession of scans of a given area of identical duration and recurring at a definite time interval, means for accumulating and storing the resultant reflected energy pulses and for transmitting said pulses at a rate that is slow as compared with said scanning frequency whereby said scans are converted into equivalent scans at a lower frequency, means responsive to each lower frequency scan to produce an undelayed and a delayed echo pattern of all fixed and moving objects in said area, the delay of said delayed pattern being equal to the lower frequency time interval corresponding to said time interval and means for converting both the undelayed and the delayed patterns to trains of electrical waves and means for superposing the wave train corresponding to the converted delayed pattern of each lower frequency scan upon the wave train corresponding to the undelayed pattern of the next succeeding lower frequency scan to produce cancellation of the electrical effects of all echoes except those where there is an absence of superpositioning.

References Cited in the file of this patent

UNITED STATES PATENTS

| | | |
|---|---|---|
| 2,407,000 | Evans | Sept. 3, 1946 |
| 2,410,424 | Brown | Nov. 5, 1946 |
| 2,422,135 | Sanders | June 10, 1947 |
| 2,437,173 | Rutherford | Mar. 2, 1948 |
| 2,491,450 | Holmes | Dec. 13, 1949 |